BINARY MULTIPLIER EMPLOYING MULTIPLE INPUT THRESHOLD GATE ADDERS

Filed Jan. 17, 1967 7 Sheets-Sheet 1

Inventor:
MAO C. WANG
BY [signature]
Attorney

BINARY MULTIPLIER EMPLOYING MULTIPLE INPUT THRESHOLD GATE ADDERS

Filed Jan. 17, 1967 7 Sheets-Sheet 2

Inventor:
MAO C. WANG
BY [signature]
Attorney

Inventor:
MAO C. WANG
By [signature]
Attorney

Inventor
MAO C. WANG
By [signature]
Attorney

Inventor
MAO C. WANG
By [signature]
Attorney

Inventor
MAO C. WANG
BY Samuel Cohen
Attorney

Inventor:
MAO C. WANG
BY [signature]
Attorney

United States Patent Office 3,524,977
Patented Aug. 18, 1970

3,524,977

BINARY MULTIPLIER EMPLOYING MULTIPLE INPUT THRESHOLD GATE ADDERS

Mao C. Wang, Westmont, N.J., assignor to RCA Corporation, a corporation of Delaware Filed Jan. 17, 1967, Ser. No. 609,949

Int. Cl. G06f 7/52

U.S. Cl. 235—164 1 Claim

ABSTRACT OF THE DISCLOSURE

This disclosure relates to binary arithmetic circuits and particularly to multipliers. Some important features of these multipliers are their exceptionally high speed and their capability of being implemented with threshold gates. These multipliers employ multiple input (2, 3 and higher numbers of input) adders.

BACKGROUND OF THE INVENTION

Binary multiplication in digital computers normally involves multiplying the multiplicand or stored multiple thereof by a multiplier digit to obtain a partial product and then temporarily storing the same; following the same procedure for the next most significant multiplier digit to obtain a second partial product; relatively shifting the second partial product and adding it to the previously obtained stored partial product to obtain a third partial product; and continuing a similar process until the remaining multiplier digits have been exhausted and the final product obtained. This type of multiplication is relatively time consuming and requires the usual equipment in a general purpose computer—storage registers, gates, arithmetic unit and the like, operated under the control of stored program instructions.

SUMMARY OF THE INVENTION

The multiplier of the present invention is a special purpose computer which includes means for concurrently obtaining the partial product of each multiplier bit and the multiplicand and a plurality of multiple bit adder means for concurrently performing additions. Each adder means produces an output (a final product bit) indicative of the sum of all partial product bits of a given significance and of the carry bit or bits produced in obtaining the final product bit of next lower significance. This multiplier operates at very high speed. For example, in an 8-bit x 8-bit multiplier discussed below, only 15 stage delays are needed to obtain even the slowest arriving final product bit.

DETAILED DESCRIPTION

The multipliers of the invention are new and improved networks which are implemented in a way which is in itself new. The multipliers are preferably made up entirely of threshold gate circuits. Before discussing the networks, the threshold gate circuits themselves are discussed.

Figure 1:
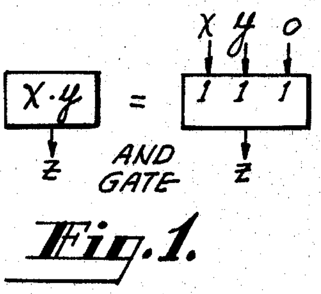
FIG. 1 is a block diagram of an AND gate employed in the networks of the invention.

FIG. 1 shows a threshold gate implementation of an AND gate. It consists of a 3-input threshold gate, each input having the weight 1 and the gate having a threshold of 2. This particular gate is known as a 3-input majority gate.

The three input terminals of the circuit above are adapted to receive three electrical signals and the circuit produces an electrical signal at its output. These signals represent binary digits and for the sake of brevity in the discussion of this gate and other circuits which follow, the binary digits or bits themselves will be referred to rather than the signals manifesting the bits.

In the operation of the AND gate of FIG. 1, if both $x$ and $y$ represent a 1, $z$ will represent a 1 because the majority of the inputs are 1. If one or both of $x$ and $y$ is a 0, then two or three of the inputs to the gate are 0 and the output $z$ is 0.

The networks of FIGS. 2 through 10 are all binary adders. In the case of the 2 and 3 input adders there is one sum bit S and one carry bit W which is produced. The carry bit W is produced on the *a* lead. In the case of the 4 and 5 bit adders, there is one sum bit and two carry bits which are produced. The latter are produced on the *a* and *b* wires, respectively. In the case of the 6 and 7 bit adders of FIGS. 9 and 10, there is one sum bit and three carry bits which are produced. The latter are produced on the *a*, *b* and *c* wires, respectively.

Table I below shows the manner in which these adders operate. $W_a$ represents the carry bit generated on the *a* wire, $W_b$ represents the carry bit generated on the *b* wire, if such a wire is present, and $W_c$ represents the bit generated on the *c* wire, if such a wire is present.

TABLE I

| No. of Input 1's | $S_i$ | $W_a$ | $W_b$ | $W_c$ |
|---|---|---|---|---|
| 0 | 0 | 0 | 0 | 0 |
| 1 | 1 | 0 | 0 | 0 |
| 2 | 0 | 1 | 0 | 0 |
| 3 | 1 | 1 | 0 | 0 |
| 4 | 0 | 1 | 1 | 0 |
| 5 | 1 | 1 | 1 | 0 |
| 6 | 0 | 1 | 1 | 1 |
| 7 | 1 | 1 | 1 | 1 |

Figure 2:
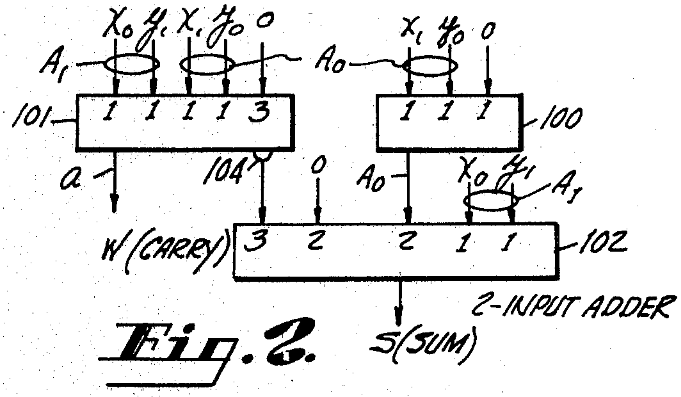
FIGS. 2–10 are block circuit diagrams of multiple input adders which may be employed in the multipliers of the invention, each adder being appropriately labelled.

The 2-input adder of FIG. 2 consists of three stages 100, 101 and 102. Stage 100 is the AND gate of FIG. 1. Stage 101 has a total of 7 input weights and a threshold of 4. The weights are represented by numerals within the block 101. Threshold gate 102 has 5 input leads, a threshold of 5 and input weights 3, 2, 2, 1, 1, a total of 9. (Weighted threshold gates are in themselves known and are described in greater detail in application Ser. No. 547,943, by Robert O. Winder, filed May 5, 1966, assigned to the same assignee as the present application.)

There are a total of 4 variables $x_1$, $y_0$, $x_0$, $y_1$ which are applied to the adder of FIG. 2. Nevertheless, this adder is termed a 2-input adder because it obtains the sum of $A_0$ and $A_1$ where $A_0=x_1y_0$ and $A_1=x_0y_1$. A logical product such as $A_1$ can be considered to be present within the adder.

It readily can be shown that the adder of FIG. 2 does operate in accordance with Table I. For example, assume that $A_1$ and $A_0$ are both 0. In this case at least 5 (suppose $x_0=x_1=0$ and $y_0=y_1=1$) of the 7-input weights to gate 101 are 0 so that W, the carry, equals 0. As $A_0=0$, gate 100 produces a 0 output. Therefore, at least 5 of the 9 input weights to gate 102 represent 0 and the sum $S=0$.

Assume $A_1=1$ and $A_0=0$. At least 4 of the 7 input weights to gate 101 are 0 so that W is still 0. However, the complementary or minority output of gate 101, indicated by the half-circle 104, is a 1. $A_1$ is also a 1 so that 5 of the 9 input weights to gate 102 are 1. Therefore, the sum produced $S=1$.

The last case which need be considered for FIG. 2 is $A_1$ and $A_0$ both equal to 1. Now, 4 of the 7 input weights to gate 101 are 1 so that $W=1$. 5 of the 9 input weights to gate 102 are 0 so that $S=0$.

Figure 3:
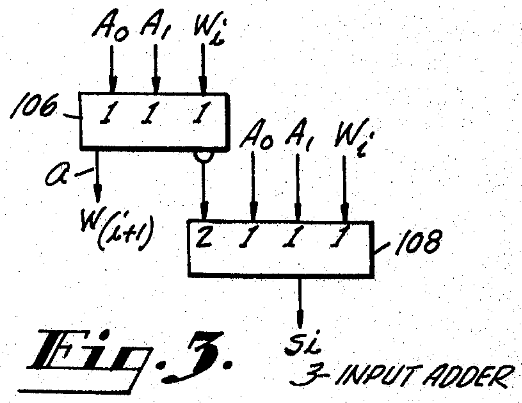

The 3-input adder of FIG. 3 consists of two threshold gates 106 and 108, the first a simple 3-input majority gate and the second a 4-input gate having a threshold of 3 and input weights 2, 1, 1, 1. Again, the operation of this gate can be explained by a few examples. Frst, assume that the input carry $W_i$ and the input bits $A_0$ and $A_1$ are all 1. In this case, the output carry $W_{i+1}$ is 1. Similarly, since 3 of the 5 inputs to gate 108 are 1, $S_i$ is 1. Note that this agrees with the table. As a second example, assume that $A_0$ is 1 and the other two inputs are a 0. The output carry W is a 0 since two of the three inputs to gate 106 are 0. The output sum $S_i$ is 1 because three of the input weights to gate 108 are 1. (The complementary output of gate 106 is a 1 and it has the weight 2 and $A_0$ is a 1 also so that the total number of input weights is three, as stated.)

Figure 4:
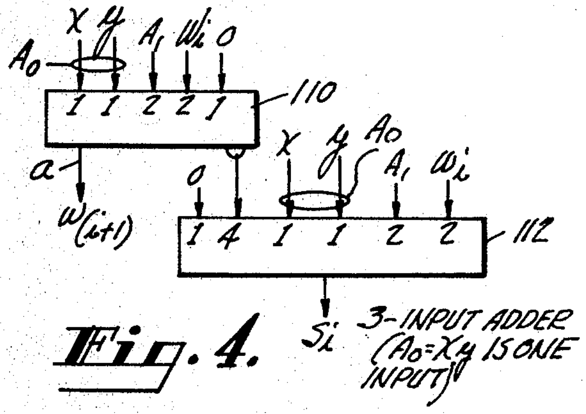

The 3-input adder of FIG. 4 consists of 2 threshold gates 110 and 112. Gate 110 has 5 input weights, 1, 1, 2, 2, 1, respectively and has a threshold of 4; gate 112 has 6 inputs, a threshold of 6, and input weights 1, 4, 1, 1, 2, 2, respectively. As in the case of the 2-input adder of FIG. 2 the adder of FIG. 4 is termed a 3-input adder because the adder considers the inputs $x$ and $y$ to be a logical product $A_0$. The 3-inputs therefore are assumed to be $A_0$, $A_1$ and $W_i$. The operation of this circuit should be clear from the explanation given of the circuit of FIG. 3. However, one example will be given for purposes of illustration. Assume $x$ and $y$ are both 0 and $A_1$ and $W_i$ are both 1. Four of the 7 input weights to gate 110 are 1 and this gate produces an output carry $W=1$. Seven of the 11 input weights to gate 12 are 0 so that the sum output $S_i$ is 0.

Figure 5:
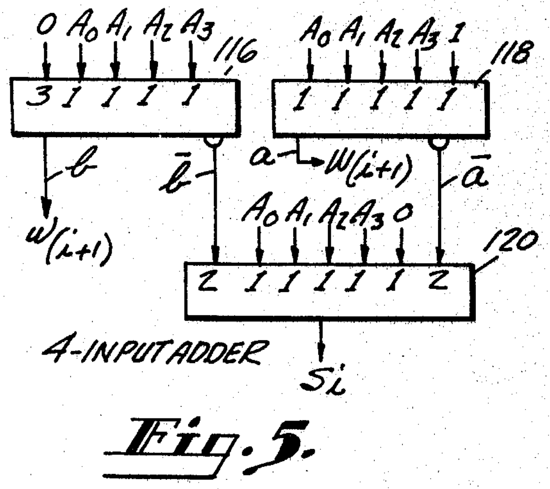

The 4-input adder of FIG. 5 consists of three threshold gates 116, 118 and 120. Gate 116 is a 5-input gate with a threshold of 4 and the respective inputs are weighted 3, 1, 1, 1, 1. Gate 118 is a 5-input gate with a threshold of 3 and with all inputs of weight 1. Gate 120 is a 7-input gate with a threshold of 5 and with input weights 2, 2, 1, 1, 1, 1, 1, respectively. The operation of the circuit of FIG. 5 may be explained by way of a few examples. Assume that all four inputs are 1. In this case, 4 of the input weights to gate 116 are 1 and 5 of the input weights to gate 118 are 1 so that the two carries produced are both 1. The complementary outputs of gates 116 and 118 are both 0. Therefore five of the nine input weights to gate 120 are 0 and the sum output is $S=0$. Assume now that three of the four inputs are 1. At gate 116 only three of the 7 input weights are 1 so that the gate produces an output carry which is 0 at its $b$ output lead. Four of the 5 input weights to gate 118 are 1 so that this gate produces an output carry of 1 at its $a$ output lead. Five of the 9 input weights to gate 120 are 1 so that the sum output of this gate is a 1.

Figure 6:
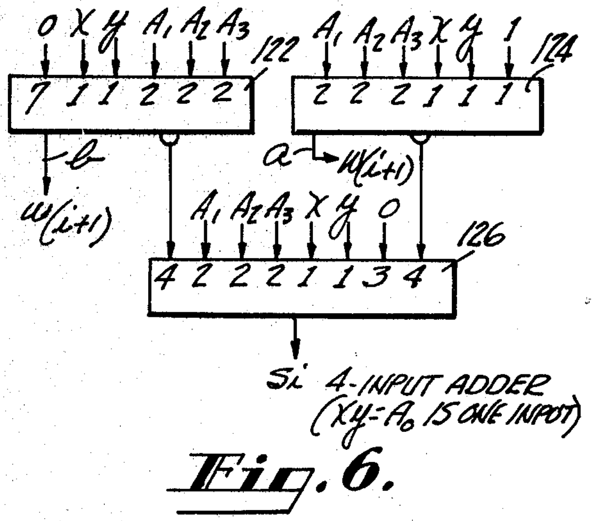

The 4-input adder of FIG. 6 consists of three gates 122, 124 and 126. Gate 122 is a 6-input gate having a threshold of 8 and input weights of 7, 1, 1, 2, 2, 2, respectively; gate 124 is a 6-input gate with a threshold of 5 and input weights of 2, 2, 2, 1, 1, 1, respectively; gate 126 is an 8-input gate having a threshold of 10 and input weights of 4, 4, 2, 2, 2, 1, 1, 3, respectively.

The operation of the adder of FIG. 6 is analogous to that of the one of FIG. 5. Note that in this adder as in some of the others, the fourth input is considered to be $A_0$, the logical product of $x$ and $y$.

Figure 7:
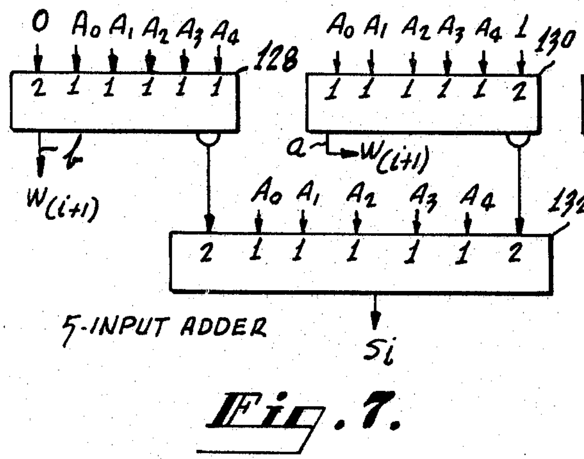

The 5-input adder of FIG. 7 comprises three gates 128, 130 and 132. Gates 128 and 130 are 6-input gates with a threshold of 4 and with input weights 2, 1, 1, 1, 1, 1. Gate 132 is a 7-input gate having a threshold of 5 and with input weights 2, 2, 1, 1, 1, 1, 1, respectively.

In the operation of the adder of FIG. 7, assume that one of the 5-input bits has the value 1 and the remaining bits are all 0. Gate 128 produces an output carry of 0. Gate 130 produces an output carry of 0 as four of the 7 input weights are 0. Gate 132 produces an output $S=1$ as 5 of the 9 input weights are 1.

As a second example, assume that all 5 input bits are 1. Gates 128 and 130 both produce an output carry equal to 1. Gate 132 produces a sum output equal to 1 as five of the 9 input weights are 1.

Figure 8:
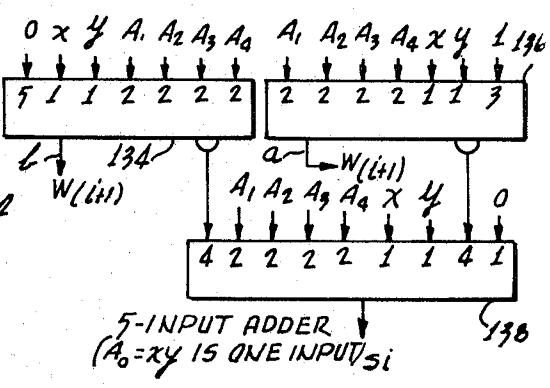

The 5-input adder of FIG. 8 comprises three gates 134, 136 and 138. Gate 134 is a 7-input gate with a threshold of 8 and with input weights 5, 1, 1, 2, 2, 2, 2; gate 136 is a 7-input gate with a threshold of 7 and with input weights 3, 2, 2, 2, 2, 1, 1; gate 138 is a 9-input gate with a threshold of 10 and with input weights 4, 4, 2, 2, 2, 2, 1, 1, 1.

The operation of the circuit of FIG. 8 is analogous to that of the circuit of FIG. 7. Again the fifth input is considered to be $A_0$ which is the logical product of $x$ and $y$.

Figure 9:
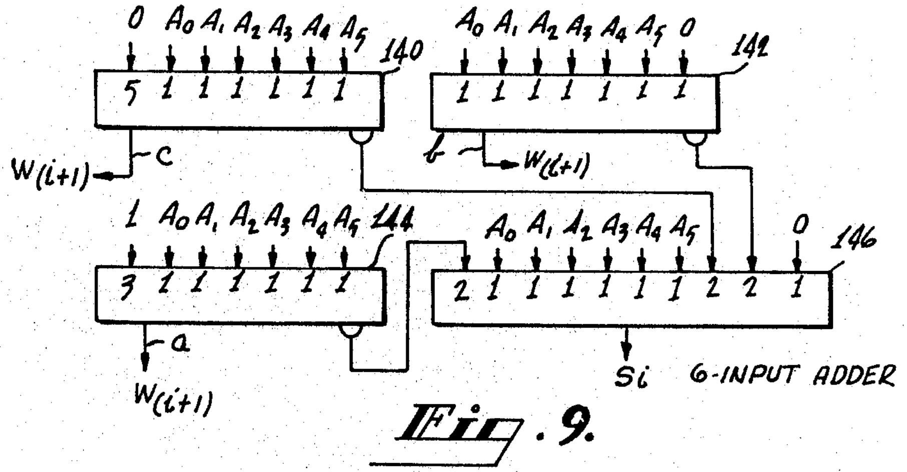

The 6-input adder of FIG. 9 comprises four threshold gates 140, 142, 144 and 146. Gate 140 is a 7-input gate having a threshold of 6 and input weights of 5, 1, 1, 1, 1, 1, 1; gate 142 is a simple 7-input majority gate which has a threshold of 4 and in which each input has the weight 1; gate 144 is a 7-input gate with a threshold of 5 and input weights 3, 1, 1, 1, 1, 1, 1; gate 146 is a 10-input threshold gate with a threshold of 7 and with input weights 2, 2, 2, 1, 1, 1, 1, 1, 1, 1.

In the operation of the adder of FIG. 9, assume all of the inputs have the value 0. Gate 140 produces a carry =0 output since all eleven input weights are 0. Gate 142 produces an output carry equal to 0 since all seven input weights are 0. Gate 144 produces an output carry equal to 0 since six of the 9 input weights are 0. Gate 146 produces a sum =0 output as seven of the 13 input weights are 0.

As a second example, assume that three of the inputs are 0 and three are 1. Eight of the 11 input weights to gate 140 are 0 so that the output carry it produces is 0. Four of the input weights to gate 142 are 0 so the output carry it produces is 0. Six of the 9 input weights to gate 144 are 1 so that it produces an output carry equal to 1. Seven of the 13 input weights to gate 146 are 1 so that it produces a sum output equal to 1.

As a third example, assume that all six input bits are a 1. Gates 140, 142 and 144 all produce output carries equal to 1 as should be clear from inspection. Gate 146, however, has 7 of its 13 input weights equal to 0 and therefore produces an output sum equal to 0. Note that all of these examples agree with Table I.

Figure 10:
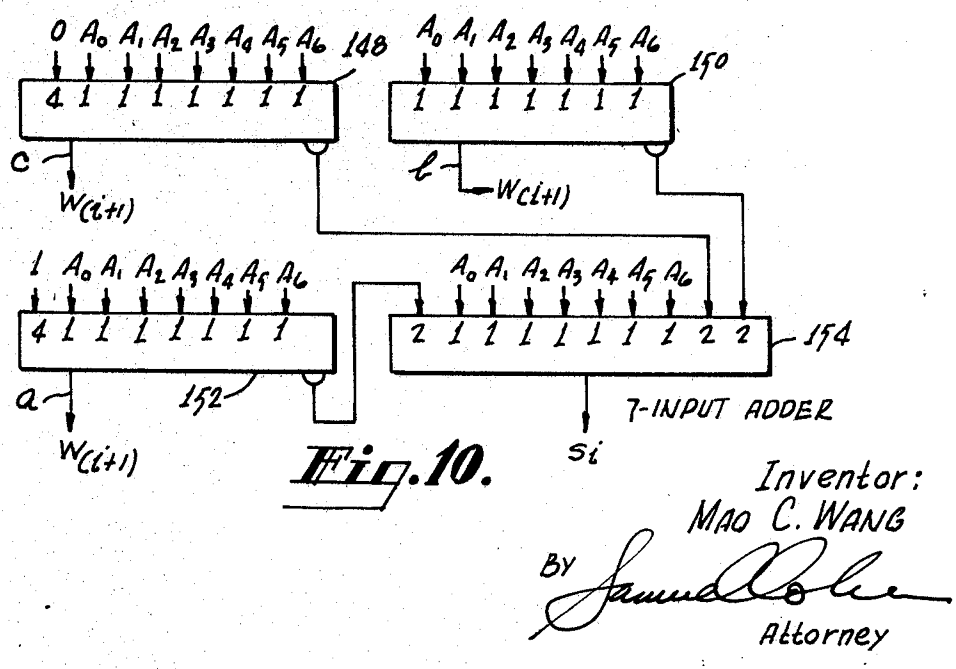

The 7-input adder of FIG. 10 comprises four threshold gates 148, 150, 152 and 154. Gate 148 has 8 inputs, a threshold of 6 and input weights of 4, 1, 1, 1, 1, 1, 1, 1; gate 150 is a simple majority gate with a threshold of 4 and with 7 inputs all of weight 1; gate 152 is the same as gate 148, however, it has a fixed bias of 1 rather than 0 applied to input terminal of weight 4; gate 154 has 10 inputs, a threshold of 7 and input weights of 2, 2, 2, 1, 1, 1, 1, 1, 1, 1. The operation of the gate should be clear from the discussion of the previous adders. The gate does implement the sum function as shown in Table I.

Figure 11:
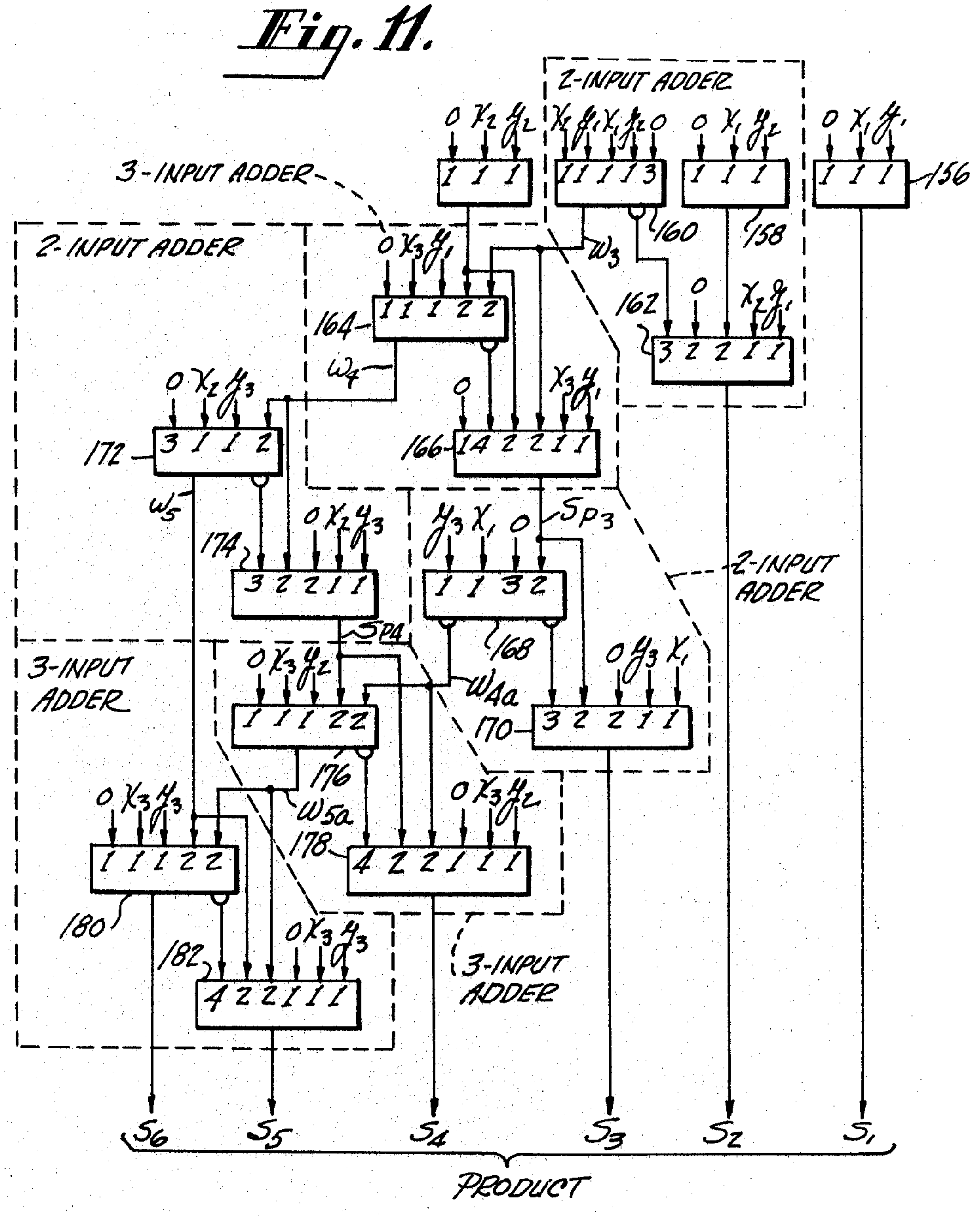
FIG. 11 is a block circuit diagram of a 3-bit by 3-bit multiplier according to the invention.

A 3 x 3 multiplier according to the invention is shown in FIG. 11. It operates in the way shown in Table II below.

TABLE II

| | | | | | | |
|---|---|---|---|---|---|---|
| | | | $y_3$ | $y_2$ | $y_1$ | |
| | | | $y_3x_1$ | $y_2x_1$ | $y_1x_1$ | $x_1$ |
| | | $y_3x_2$ | $y_2x_2$ | $y_1x_2$ | | $x_2$ |
| | $y_3x_3$ | $y_2x_3$ | $y_1x_3$ | | | $x_3$ |
| | $\boxed{W_5}$ | $\boxed{W_4}$ | $\boxed{W_3}$ | | | |
| | $\boxed{W_{5a}}$ | $\boxed{W_{4a}}$ | | | | |
| $S_6$ | $S_5$ | $S_4$ | $S_3$ | $S_2$ | $S_1$ | |

In the operation depicted in Table II, the circuit obtains the logical product of $x_1$ and $y_1$ and this is the product bit of least significance $S_1$. The circuit obtains the logical product of $x_1$ and $y_2$ and $x_2$ and $y_1$, and adds these two quantities directly to obtain the product bit of next significance $S_2$ and a carry bit $W_3$. In Table II the solid line rectangle around $W_3$ indicates that it is a carry.

The circuit adds the logical products $y_3x_1$, $y_2x_2$, $y_1x_3$ to the carry bit $W_3$ above to obtain the final product bit of next significance $S_3$. During the addition, two carries $W_4$ and $W_{4a}$ may be generated.

The remainder of the operation should be clear from the chart.

In the chart of Table II, the assumption is made that the least significant bit is $y_1$. Note that the first row of the chart is the product of the least significant multiplier bit $x_1$ and the multiplicand $y_3$, $y_2$, $y_1$. The second row represents the product of the next significant multiplier bit $x_2$ and the multiplicand, and so on. Note that the second and third pratial products are each shifted one place to the left. As will be shown shortly, this shifting is automatic.

FIG. 11 should now be referred to. AND gate 156 produces the least significant product bit $S_1$. Gates 158, 160 and 162 together comprise a 2-input adder. They obtain the sum of $y_2x_1$ and $y_1x_2$. This sum $S_2$ is the next most significant bit of the product as should be clear from Table II. The carry $W_3$ generated by stage 160 is applied to the following adder.

Stages 164 and 166 together comprise a 3-input adder such as shown in FIG. 4. This adder obtains the sum of $W_3$, the previous carry, and $x_2y_2$ and $x_3y_1$. The sum $S_{P3}$ produced at stage 166 is a partial product bit. The carry $W_4$ propagates to the left to tht next adder stage.

The stages 168 and 170 together comprise a 2-input adder of the type shown in FIG. 2. They add the partial product bit $S_{P3}$ to the logical product $y_3x_1$. The sum bit produced, that is $S_3$, is the next most significant product bit. The carry bit $W_{4a}$ propagates to the left to the next adder.

The stages 172 and 174 together comprise a 2-input adder which adds the carry $W_4$ to the logical product $x_2y_3$. The sum bit $S_{P4}$ which is generated is a partial product bit. The carry bit $W_5$ is employed to calculate the most significant product bit $S_6$ and also the product bit $S_5$.

The next two stages 176 and 178 together comprise a 3-input adder. They add the partial product bit $S_{P4}$, the carry bit $W_{4a}$ and the logical sum $x_3y_2$ together. The sum bit obtained $S_4$ is the final product bit of next significance. The carry bit $W_{5a}$ which is generated is employed in obtaining the two most significant product bits.

The final stages 180 and 182 together comprise a 3-input adder. They add the two carries $W_5$ and $W_{5a}$ to $x_3y_3$ to obtain a sum bit $S_5$ which is the next to the most significant final product bit and a carry bit $S_6$ which is the most significant product bit.

An important advantage of the circuit of FIG. 11 is its very high speed. No storage or shifting is necessary. All adders produce concurrent outputs, that is, each sum and carry signal is present during a common time interval, although the leading edges of many of these signals are delayed relative to one another by intervals proportional to the number of stages employed to produce such signals. The bit of the final product delayed the greatest interval of time (the worst case) is obtained with seven stage delays.

While the network of FIG. 11 is shown to be implemented solely with threshold gates, by way of example, the invention is also adaptable to the use of other, non-threshold gate circuits which can perform the same logical functions. The network of FIG. 11 may be designed, for example, with NOR gates. Such a design can be shown to require 41 gates, to have a total of 87 gate leads and to have eight stage delays. The same circuit implemented with threshold gates, as shown, employs only 15 gates, has a total of only 70 gate terminals and has only seven stage delays.

Figure 13:
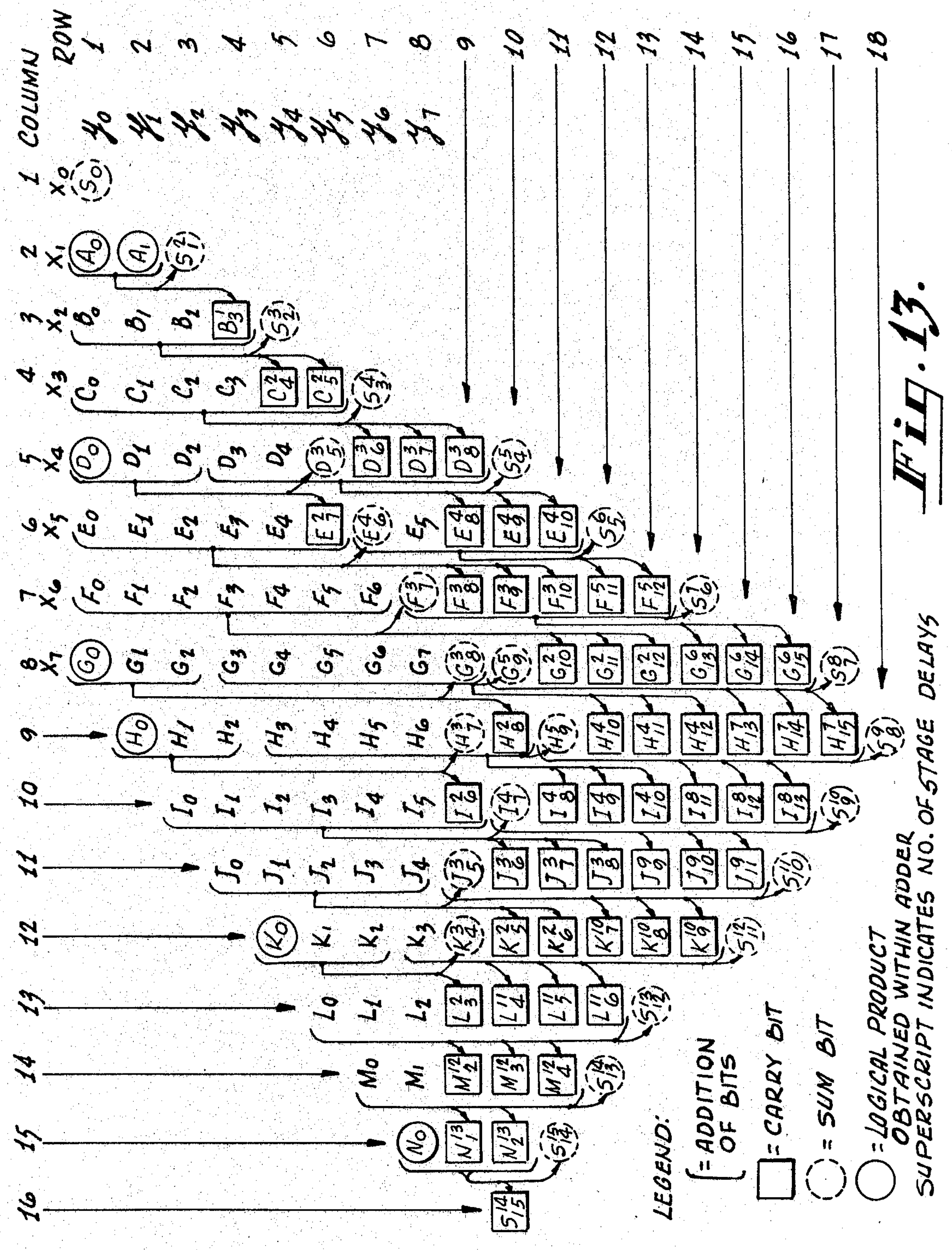
FIG. 13 is a chart to help explain the operation of the adder of FIGS. 12*a*–12*c*.

The design of an 8 x 8 binary multiplier is shown in FIG. 13. The least significant input bits are $x_0$ and $y_0$, respectively and most significant are $x_7$ and $y_7$. A bit such as $C_0$ is the logical product of $x_3$ and $y_0$. In other words $C_0=x_3y_0$. Similarly, $C_1=x_2y_1$; $C_2=x_1y_2$; $C_3=x_0y_3$. In a similar manner, $E_0=x_5y_0$; $E_1=x_4y_1$; $E_2=x_3y_2$; $E_3=x_2y_3$; $E_4=x_1y_4$.

The brackets in the table represent addition. For example, the brackets which enclose $F_0$, $F_1$ . . . $F_5$, $F_6$ represents the addition of these seven bits. This may be accomplished, for example, in a 7-bit adder of the type shown in FIG. 10.

A solid line circle around the letter indicates that the logical sum within the letter is considered to be present within an adder stage. For example in FIG. 2, $A_1$ would be represented by ($A_1$)

because the logical product need not be obtained separately.

A square around a letter indicates that the bit represented by the letter is obtained as a carry output of an adder. A dashed circle around a letter indicates that this bit is obtained as a sum output of an adder. For example, in the addition of ($D_0$) to $D_1$ to $D_2$ shown in column 5, a sum bit ($D_5^2$) and a carry bit [$E_7^2$]

are obtained. In the addition of the bits of column 3, that is, the addition of $B_0$, $B_1$ and $B_2$ and $B_3^1$ the sum bit ($S_2^3$) and the carry bits [$C_4^2$]

and [$C_5^2$]

are obtained.

The rows of the table of FIG. 13 represent logical products. For example, the first row $G_0$, $F_0$, $E_0$, $D_0$, $C_0$, $B_0$, $A_0$, $S_0$ is the logical product of the multiplicand $x_7$ . . . $x_0$ and the least significant multiplier bit $y_0$.

The superscripts in the table indicate the number of stage delays. The subscripts applied to the final product bits indicate the significance of these bits. For example, $S_0$ is the least significant sum bit and, since it has no superscript, it is obtained in one stage delay. The product bit $S_1^2$ (column 2, row 3) is the $2^1$ product bit and it is obtained in two stage delays. The sum bit $S_{11}^{12}$ (column 12, row 15) is the $2^{11}$ product bit and it is obtained in 12 stage delays.

The table also shows that the final product bits are obtained by adding together all of the bits appearing in that same column. For example, the sum bit $S_4^5$ is obtained in the following way. The bits $D_0$, $D_1$ and $D_2$ are added in a 3-bit adder. The partial product bit $D_5^3$ (the sum output of the adder) thereby obtained is added to $D_3$ and $D_4$ and $D_6^3$ and $D_7^3$ and $D_8^3$ in a 6-bit adder. Note that of these six bits, the last three mentioned are carry bits generated during the operation depicted in column 4. The sum obtained as a result of this 6-bit addition is the $2^4$ product bit $S_4^5$ and it is obtained in five stage delays.

Figure 12A:
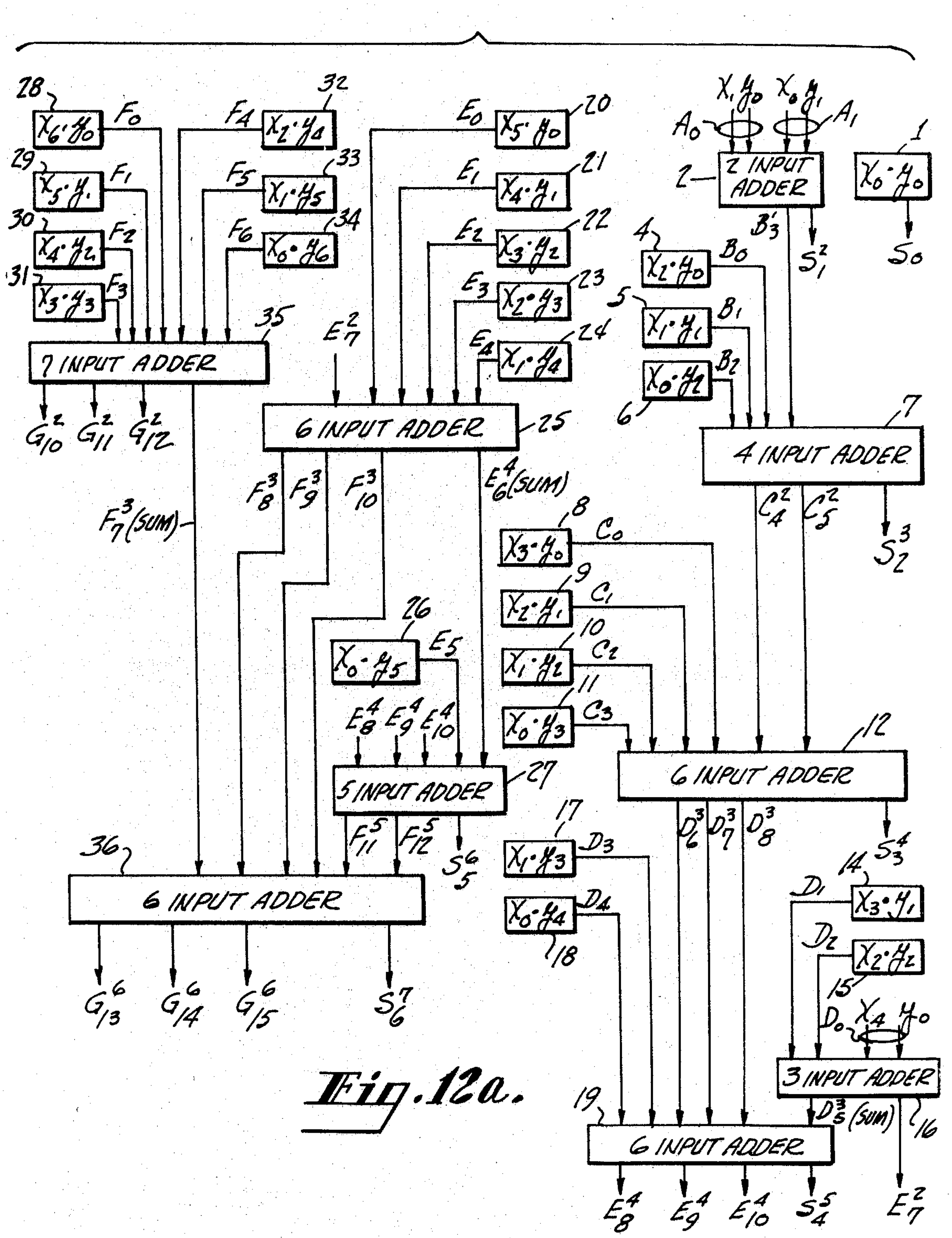
FIGS. 12*a*, 12*b* and 12*c* together show an 8-bit by 8-bit multiplier according to the invention.
Figure 12B:
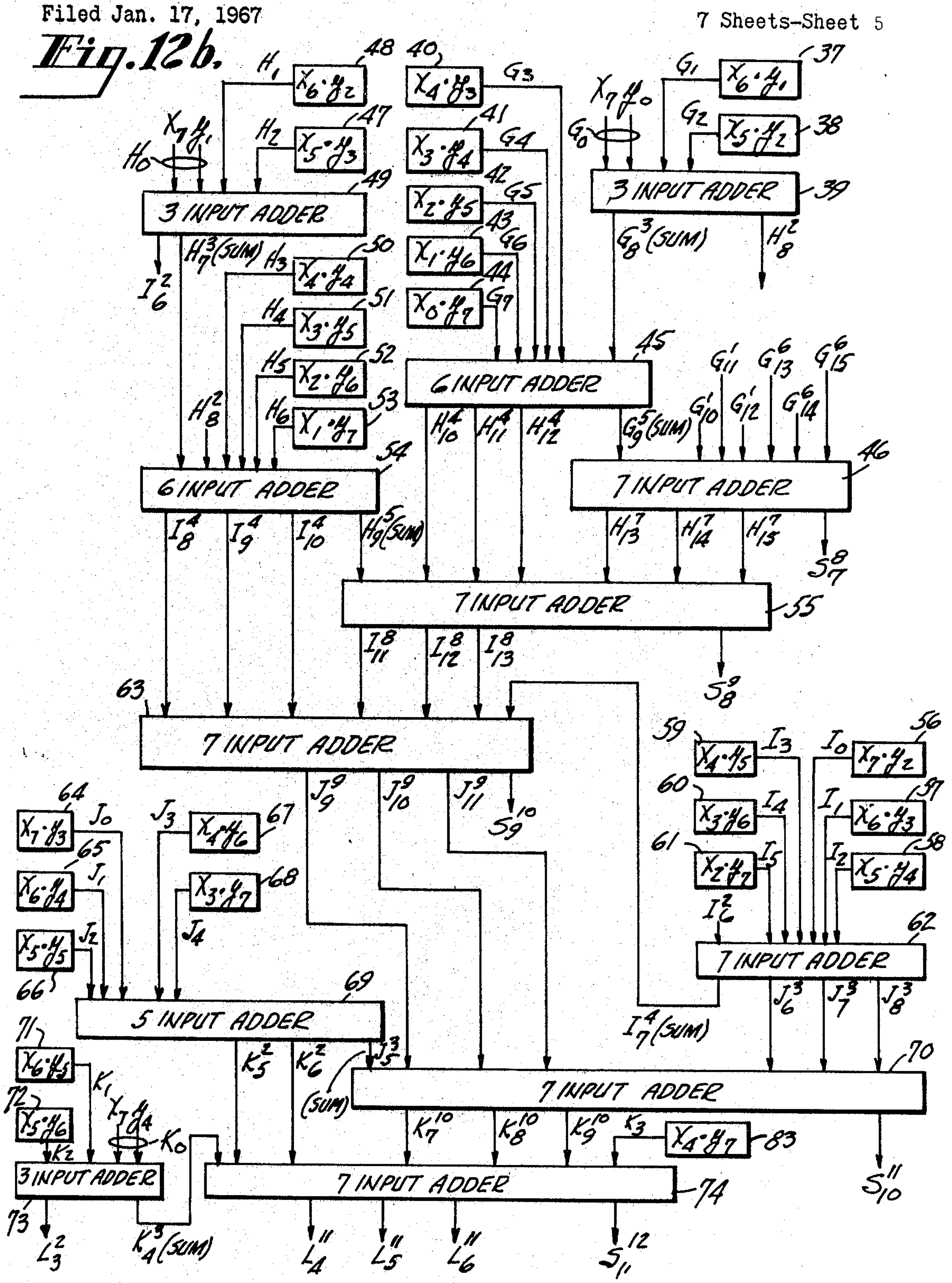
Figure 12C:
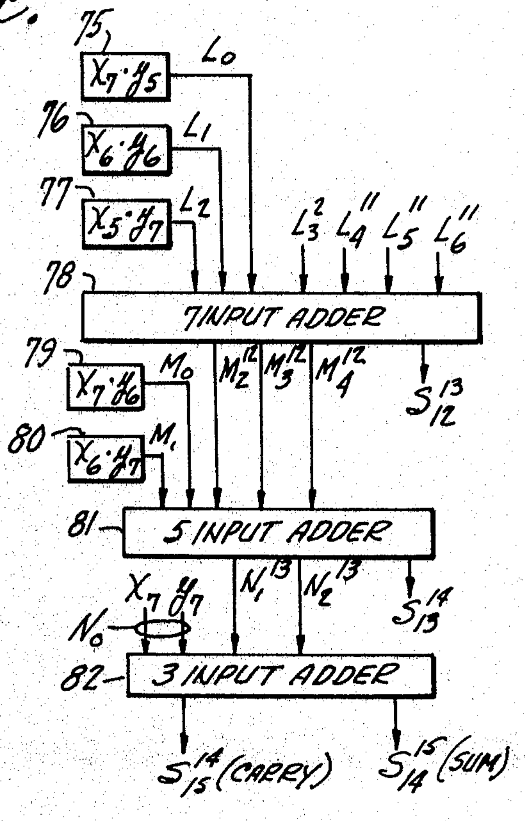

The multiplier shown symbolically in FIG. 13 is shown in block circuit diagram form in FIGS. 12*a*, 12*b* and 12*c*.

The adders of these figures are the threshold gate adders of FIGS. 2–10. From the foregoing explanation, the operation of the multiplier of FIGS. 12a–12c should be easy to follow. For example, the least significant product bit which is the logical product of $x_0$ and $y_0$, $S_0$ is obtained by an AND gate 1. The $2^1$ product bit is produced by the 2-input adder 2 (the details of which are given in FIG. 2). The latter adds $A_0$ and $A_1$, that is, it adds $x_1y_0$ and $x_0y_1$. The 2-input adder 2 also produces a carry $B_3^1$ which in FIG. 13 is shown to propagate to the next column to the left and in FIG. 12a is shown as on e of the inputs to the 4-input adder 7 (the details of which are given in FIG. 5). Returning again to FIG. 13, it is seen that the $2^2$ product bit $S_2^3$ is obtained by adding $B_0$, $B_1$, $B_2$ and the carry bit $B_3^1$ The three AND gates 4, 5 and 6 of FIG. 12a obtain the B bits $B_0$, $B_1$ and $B_2$ and the 4-input adder 7 adds these three bits to the carry bit $B_3^1$ to obtain the $2^2$ product bit $S_2^3$ As one final example, it may be observed from FIG. 13, column 10, that the bits $I_0 \ldots I_5$ and $I_6^2$ must be added together to obtain a partial product bit (the sum bit) $I_7^4$ and three carry bits $J_6^3$ $J_7^3$ $J_8^3$ The stage which implements this function is shown at the lower right of FIG. 12b. It is a 7-input adder 62 (the details of which are given in FIG. 10) which receives the I bits generated by AND gates 56 through 61 and which receives also the carry bit $I_6^2$ produced by a previous adder 49 shown at the upper left of FIG. 12b. The adder 62 produces the partial product bit $I_7^4$ and three carry bits $J_6^3$ $J_7^3$ $J_8^3$ While the invention has been illustrated in terms of a 3-bit x 3-bit multiplier and an 8-bit x 8-bit multipler it is to be appreciated that the principles are applicable to multipliers of any size. It should also be appreciated that the partial product bits may be added in any convenient way. Thus, if it is found that the fan-in requirement (the number of inputs needed to a logic stage) is too severe in a particular engineering design, 6-input and 7-input adders need not be employed and the entire adder designed instead with 2-, 3-, 4- and 5-input adders or even with only 2- and 3-input adders. (As an example, rather than employing a 6-bit adder to add the 6 C bits of column 4 of FIG. 13, two 3-bit adders and one 2-bit adder may be used instead. The first 3-bit adder adds $$C_0+C_1C_2$$

the second adds the sum bit produced to $C_3$ and $C_4^2$ the 2-bit adder adds the sum bit produced by the second adder to $C_5^2$.)

The penalty generally paid, however, when smaller numbers of input adders are employed, is an increase in the number of stage delays. On the other hand, it is possible to use 8, 9, 10 or higher numbers of input adders. The use of the larger number of input adders reduces the number of stage delays and the total number of gates but the engineering tolerances become more severe.

The use of threshold logic stages to implement the multipliers of the invention results in a great saving in equipment. In the multiplier of FIGS. 12a, 12b and 12c there is a total of 138 gates, the maximum fan-in is 13, all sum and carry bits are produced concurrently, that is, during a common time interval they are all present and the maximum number of stage delays is 15. A NOR gate implementation of an adder such as this requires about three times this number of gates (422 to be exact) and there is a substantially greater number of stage delays (a maximum of 28 in one particular design).

What is claimed is:

1. A binary multiplier for multiplying a multiplicand word $y_n, y_{n-1} \ldots y_0$ by a multiplier word $x_n, x_{n-1} \ldots x_0$ comprising, in combination:

means for producing an output signal indicative of $x_0y_0$;

a plurality of multiple bit adder means, each consisting solely of interconnected threshold gates, each for producing signals indicative of the sum and carry of a group of bits chosen from A, *xy*, S and W bits, where A is a partial product and consists of the logical product of an *x* bit and a *y* bit, *xy* is a logical product, S is a sum bit, and W is a carry bit;

means for concurrently applying to each adder means a group of signals chosen from signals representing A, *x*, *y*, S and W bits for causing each adder means to produce output signals representing S and W bits, where the signals representing S and W bits applied to any adder means and derived from another adder means; and means for interconnecting said adder means in such a way as concurrently to produce sum signal outputs indicative of the sums of partial products of the multiplicand and multiplier bits which sum signal outputs represent the bits other than $x_0y_0$ of the product of the multiplicand and multiplier words.

References Cited

UNITED STATES PATENTS

| | | | |
|---|---|---|---|
| 2,941,720 | 6/1960 | Marshall et al. | 235—164 |
| 3,346,729 | 10/1967 | Dell et al. | 235—164 |
| 3,393,304 | 7/1968 | Dell et al. | 235—172 |
| 3,300,628 | 1/1967 | Coates et al. | 235—164 X |
| 3,275,812 | 9/1966 | Coates et al. | 235—172 X |

MALCOLM A. MORRISON, Primary Examiner

D. H. MALZAHN, Assistant Examiner

U.S. Cl. X.R.

235—172